United States Patent [19]
Gibb

[11] 4,333,350
[45] Jun. 8, 1982

[54] DIFFERENTIAL PRESSURE SENSING DEVICE

[76] Inventor: James M. Gibb, 15 Etive Dr., Airdrie, Scotland

[21] Appl. No.: 145,396

[22] Filed: May 1, 1980

[51] Int. Cl.³ .............................................. G01L 7/08
[52] U.S. Cl. .......................................... 73/715; 92/48
[58] Field of Search ................. 73/715, 716, 717, 718, 73/719–729; 29/454, 460; 92/48, 99 R, 98

[56] References Cited

U.S. PATENT DOCUMENTS

| | | | |
|---|---|---|---|
| 2,627,750 | 2/1953 | Titus | 73/716 |
| 2,641,928 | 6/1953 | Howell | 73/170 |
| 2,925,829 | 2/1960 | Thompson, Sr. | 29/454 |
| 2,999,385 | 9/1961 | Wolfe | 73/718 |
| 2,999,386 | 9/1961 | Wolfe | 73/718 |
| 3,085,437 | 4/1963 | Osterstrom | 73/716 |
| 3,353,410 | 11/1967 | MacNeil | 73/715 |
| 3,400,908 | 9/1968 | Bauer | 92/99 |
| 3,485,104 | 12/1969 | Sanford | 73/722 |
| 3,618,390 | 11/1971 | Frick | 73/718 |
| 3,999,435 | 12/1976 | Seigel | 73/716 |

*Primary Examiner*—Donald O. Woodiel
*Attorney, Agent, or Firm*—Clyde C. Blinn

[57] ABSTRACT

A differential pressure measuring device comprises a capsule including three correspondingly shaped side by side diaphragms secured to each other at their outer edges and encased in a capsule with the diaphragms surrounded by a potting compound which is placed in the capsule in a fluid condition and with pressure being applied to the capsule to hold the outer diaphragms in a limited position, the potting compound is allowed to harden or set.

5 Claims, 2 Drawing Figures

DIFFERENTIAL PRESSURE SENSING DEVICE

BACKGROUND OF THE INVENTION

In many differential pressure measuring devices wherein a diaphragm is moved in response to a difference in pressure, various means are provided to prevent damage to the diaphragm when the differential pressure becomes excessive. In most cases, the movement of the diaphragm against the stop, or other types of restraining means, is only sufficient for certain limited over pressure conditions. Some of the differential pressure measuring devices provide for supports that completely restrain the diaphragm and result in no damage during over pressure conditions. One of which is shown in the Philip H. Sandford U.S. Pat. No. 3,485,104 issued Dec. 23, 1969; however, the Sandford type of differential pressure measuring device is expensive to make and therefore expensive to a limited marketability.

SUMMARY OF THE INVENTION

The present invention relates to a differential pressure measuring device with overload protection. The differential pressure measuring device comprises a capsule including these correspondingly shaped side by side diaphragms secured to each other at their outer peripheral edges. The outer two diaphragms defining the limit positions for the movable inner diaphragm which is used to sense the differential of two pressures applied on opposite sides of the inner diaphragm. The outer diaphragms are supported by a setable material encasing the capsule.

DESCRIPTION OF THE PREFERRED EMBODIMENT

Figure 1:
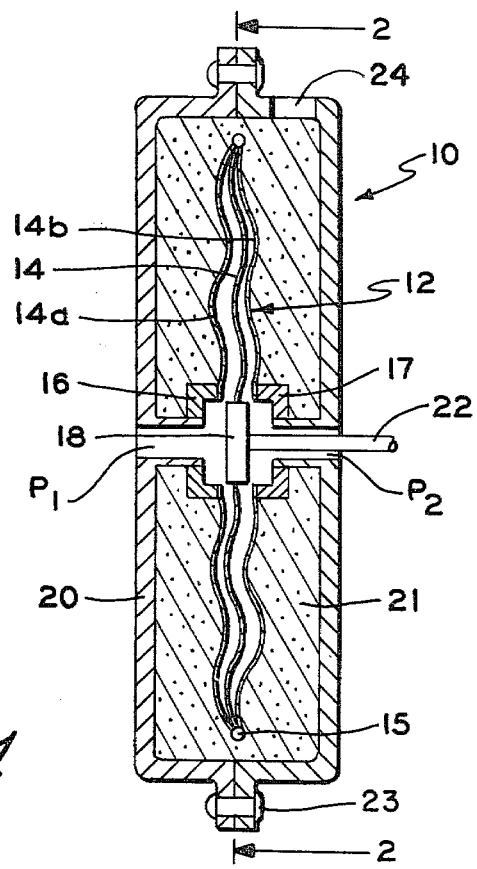
FIG. 1 of the drawing is the differential pressure measuring device showing the capsule in cross section with the outer diaphragms supported by a setable material.
Figure 2:
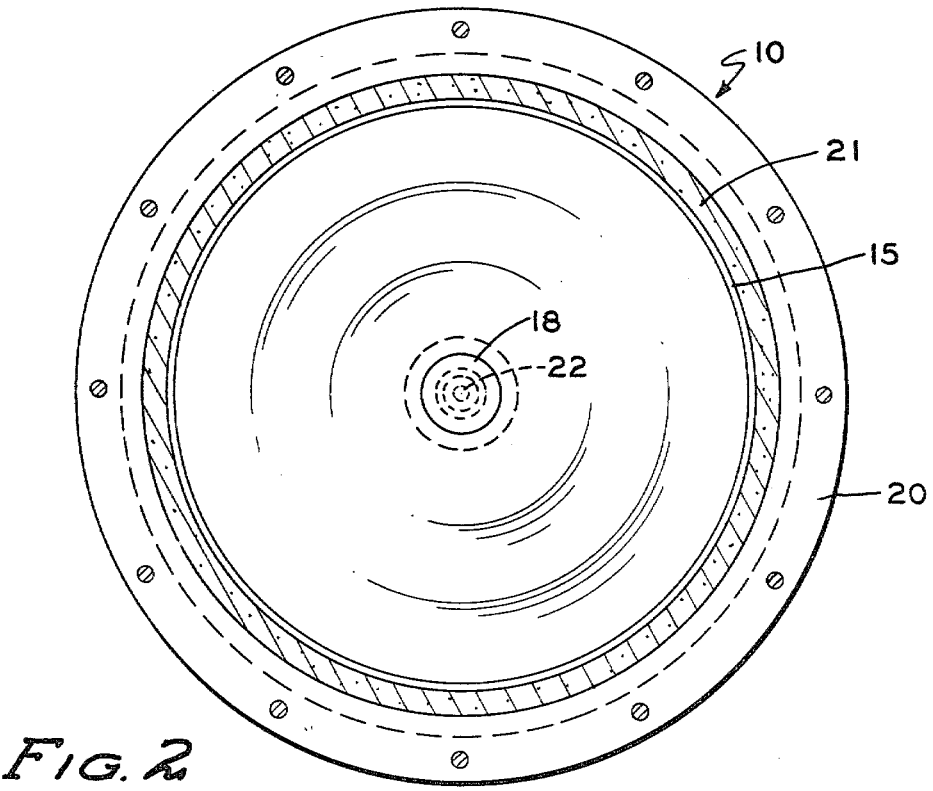
FIG. 2 is a front cross sectional view of the differential pressure measuring device of FIG. 1.

Referring to FIG. 1, the differential pressure measuring device or apparatus 10 comprises a capsule 12 consisting of three correspondingly, side by side, diaphragms or flexible members 14, 14A and 14B, which are secured to each other at the outer periphery or peripheral edges of the diaphragms by some suitable fastening method or means such as welding. Diaphragms 14A and 14B are secured to the respective angular sleeves 16 and 17. The inner diaphragm 14 is secured to a disc or member 18. Surrounding the capsule is a two part casing or enclosure housing 20. The two parts are connected by some suitable means such as welding or rivets 23. The space between casing 20 and capsule 12 is filled through hole 24 with a suitable potting or setable plastic filling compound 21, which after being placed inside the space in liquid or fluid form, hardens against the outer diaphragms 14A and 14B to hold the diaphragms in a fixed position which is established by their initial shape on manufacture.

In use, the inner diaphragm 14 senses the differential pressure of two pressures P1 and P2. Gas or liquid under pressure is transmitted to the opening in the casing on each side of diaphragm 14 to provide for the movement of diaphragm 14 in one direction or the other depending upon the difference in the pressures. An output at shaft, rod or member 22 is connected to diaphragm 14. Shaft 22 could be connected to some suitable device using the output signal indicative of the differential pressure between pressures P1 and P2.

During the manufacture of the differential pressure measuring device, diaphragms 14, 14A and 14B are preferably produced from the same forming tool so that they are provided with perfectly matching shapes as seen by the cross sectional view in FIG. 1. To assemble the capsule the sleeves 16 and 17, and disc 18 are first secured to the centers of their respective diaphragms and then the outer peripheries of the diaphragms are secured together. The assembled capsule is then located within casing 20 and a predetermined pressure is applied to both sides of the inner diaphragm 14 to cause the outer diaphragm to take up their desired overload limit positions relative to the inner diaphragm 14. When in these limit positions, the liquid potting compound 21 is inserted into the space between the casing and the capsule to encase the capsule and with the pressure being retained on both side of diaphragm 14, compound 21 is allowed to set or harden completely before the pressure is removed.

The embodiments of the invention in which an exclusive property or right is claimed are defined as follows:

1. A differential pressure measuring device comprising, a capsule comprising three correspondingly shaped side by side flexible members, means securing said members to each other at their outer peripheral edges, said outer members providing a limiting position for an inner member, an output member connected to said inner member to provide an output when a differential pressure is applied across said inner member, housing means for said capsule, and a liquid filling surrounding said capsule, said filling hardening when said outer members are held in a predetermined limiting position.

2. The invention of claim 1 wherein said members are disc type diaphragms.

3. The invention of claim 2, wherein the outer diaphragms are each secured at their centers to a respective one of two annular sleeves and the inner diaphragm is secured at its center to a member, said member providing an output indicative of differential pressure across said center diaphragm.

4. A method of making a differential pressure measuring device comprising the steps of producing the three diaphragms from the same forming tool, securing the outer peripheries of the diaphragms together, locating the diaphragm assembly within a casing, applying a predetermined pressure to both sides of the inner of said three diaphragms to cause the outer diaphragms to take up their desired overload limit positions relative to the inner diaphragm, inserting a liquid compound into the space between the casing and outer diaphragms while being held in their limit positions to encase the three diaphragm assembly, and allowing the compound to harden before the predetermined pressure is released.

5. The claim 4 wherein sleeves and output members are secured to their respective diaphragms before the diaphragm assembly is located within the casing.

* * * * *